US011584405B2

(12) United States Patent
Goncalves et al.

(10) Patent No.: US 11,584,405 B2
(45) Date of Patent: *Feb. 21, 2023

(54) VEHICLE BRAKE SYSTEM

(71) Applicant: Faiveley Transport Amiens, Amiens (FR)

(72) Inventors: Claudino Goncalves, Ribeaucourt (FR); Damien Beauvois, Amiens (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 205 days.

This patent is subject to a terminal disclaimer.

(21) Appl. No.: 17/103,603

(22) Filed: Nov. 24, 2020

(65) Prior Publication Data
US 2021/0078618 A1 Mar. 18, 2021

Related U.S. Application Data

(63) Continuation of application No. 16/086,373, filed as application No. PCT/FR2017/050658 on Mar. 21, 2017, now Pat. No. 10,875,553.

(30) Foreign Application Priority Data

Mar. 21, 2016 (FR) ...................................... 1652420

(51) Int. Cl.
*B61H 13/20* (2006.01)
*B61H 5/00* (2006.01)
(Continued)

(52) U.S. Cl.
CPC ................ *B61H 13/20* (2013.01); *B60T 7/12* (2013.01); *B60T 13/665* (2013.01);
(Continued)

(58) Field of Classification Search
CPC ............. F16D 2121/06; F16D 2121/34; F16D 2121/30; F16D 2127/02; F16D 66/00;
(Continued)

(56) References Cited

U.S. PATENT DOCUMENTS 4,351,423 A * 9/1982 Rogier .................... F16D 59/02
188/72.3
4,453,687 A * 6/1984 Sweere .................. F16M 11/10
248/183.3

(Continued)

*Primary Examiner* — Robert A. Siconolfi
*Assistant Examiner* — James K Hsiao
(74) *Attorney, Agent, or Firm* — The Small Patent Law Group LLC; Christopher R. Carroll

(57) ABSTRACT

Disclosed is a brake system for a railroad vehicle, including a parking brake provided with a piston and having a first configuration in which the piston is in a working position in which it acts on a lining support and applies a predetermined force to a brake disc; a second configuration in which the piston is in a rest position in which it does not act on the support and does not apply any force to the disc; and a third configuration in which, when the vehicle is not at a standstill and the ambient temperature in the environment of the disc is greater than a threshold value, it forces the piston to move towards a trip position different from its working and rest positions, in order to limit or cancel the force applied to the disc.

20 Claims, 5 Drawing Sheets

(51) Int. Cl.
*F16D 59/02* (2006.01)
*B60T 17/22* (2006.01)
*B60T 13/66* (2006.01)
*B60T 17/08* (2006.01)
*B60T 7/12* (2006.01)
*B61H 11/02* (2006.01)
*B61H 13/00* (2006.01)
*B61H 13/34* (2006.01)
*F16D 55/226* (2006.01)
*F16D 65/18* (2006.01)
*F16D 66/00* (2006.01)
*F16D 121/06* (2012.01)
*F16D 121/34* (2012.01)
*F16D 127/02* (2012.01)
*F16D 125/18* (2012.01)
*F16D 127/00* (2012.01)
*F16D 129/14* (2012.01)

(52) U.S. Cl.
CPC .......... *B60T 17/086* (2013.01); *B60T 17/228* (2013.01); *B61H 5/00* (2013.01); *B61H 11/02* (2013.01); *B61H 13/005* (2013.01); *B61H 13/34* (2013.01); *F16D 55/226* (2013.01); *F16D 59/02* (2013.01); *F16D 65/18* (2013.01); *F16D 66/00* (2013.01); *F16D 2066/001* (2013.01); *F16D 2121/06* (2013.01); *F16D 2121/34* (2013.01); *F16D 2125/18* (2013.01); *F16D 2127/001* (2013.01); *F16D 2127/02* (2013.01); *F16D 2129/14* (2013.01)

(58) Field of Classification Search
CPC .. F16D 59/02; F16D 55/226; F16D 2066/001; B60T 17/086; B60T 7/12; B60T 17/228
See application file for complete search history.

(56) References Cited

U.S. PATENT DOCUMENTS

| | | | |
|---|---|---|---|
| 5,046,404 A * | 9/1991 | Schnorenberg, Jr. ... | F16D 65/18 92/130 B |
| 5,131,511 A * | 7/1992 | Appleberry ............. | B60T 13/04 188/176 |
| 6,477,939 B1 * | 11/2002 | Siebke .................. | B60T 17/083 92/130 R |
| 8,720,652 B2 * | 5/2014 | Certo ..................... | F16D 65/18 188/72.3 |
| 9,701,290 B2 * | 7/2017 | Baehrle-Miller ....... | B60T 8/171 |
| 2004/0113486 A1 * | 6/2004 | Koga .................... | B60T 13/66 303/20 |
| 2015/0360664 A1 * | 12/2015 | Svensson ............... | B60T 7/12 701/70 |
| 2016/0176388 A1 * | 6/2016 | Baehrle-Miller ..... | F16D 65/183 701/70 |
| 2017/0137002 A1 * | 5/2017 | Taneyhill .............. | B60T 8/1708 |
| 2018/0148075 A1 * | 5/2018 | Thomas ................ | B60T 13/665 |

* cited by examiner

VEHICLE BRAKE SYSTEM

CROSS-REFERENCE TO RELATED APPLICATIONS

This application is a continuation of U.S. patent application Ser. No. 16/086,373, filed on 19 Sep. 2018, which is a national stage entry application entered pursuant to 35 U.S.C. § 371 of PCT Application No. PCT/FR2017/050658, filed 21 Mar. 2017, which claims priority to French patent application 1652420, filed 21 Mar. 2016. The entire disclosures of these applications are incorporated herein by reference.

BACKGROUND

Technical Field

The invention concerns the field of the braking of rail vehicles and more particularly rail vehicle braking systems for rail vehicles provided with a parking brake configured to act on a braking member, in particular when the rail vehicle is stationary.

Discussion of Art

Rail vehicles are generally equipped with service brake and/or parking brake calipers provided with a service brake and/or parking brake cylinder.

This cylinder comprises a brake piston movable under the effect of the action of one or more springs and furthermore movable under the effect of a fluid under pressure.

The movement of the braking piston under the effect of the springs leads to a braking action such as the clamping of a brake disk between two linings.

On the contrary, the movement of the braking piston under the effect of the fluid under pressure leads to an opposite action to the braking, i.e. the unclamping of the brake and thereby enables the brake to be let off.

More specifically, this type of brake cylinder comprises a body in which and relative to which the brake piston is movable to act on the braking member via a thrust rod.

The brake cylinder also comprises a cavity configured in the body and provided to receive the springs, as well as a pressure chamber formed at least partly in the cavity, delimited in particular by the braking piston and by the body, and connected by a pipe to a source of pressure agent.

When the pressure chamber is not supplied by the source of pressure agent, the springs are configured to act on the braking piston to place it in a braking position; whereas when the pressure chamber is supplied by the source of pressure agent, the braking piston acts against the springs to return into a resting position in which the brake is readied by not applied and the springs are compressed.

In other words, to ready the brake, the pressure chamber is supplied with pressure agent, also called fluid under pressure, via the corresponding source so as to move the braking piston within the body and compress the springs; whereas to apply the brake, the pressure chamber is vented, such that the springs push the braking piston

BRIEF DESCRIPTION

The invention concerns a rail vehicle braking system, provided with a parking brake having, in particular in terms of safety, improved performance relative to the braking system of the aforementioned prior art, while being simple, convenient and economical.

According to a first aspect, the invention thus relates to a rail vehicle braking system for a rail vehicle having braking members with at least one lining and at least one disk, comprising a parking brake having a body presenting a cavity, a lining mounting which is movable relative to said body and configured to act on at least one said braking member, as well as an actuator comprising a braking piston at least partly accommodated in said cavity, movable relative to said body and configured to act on said lining mounting; said system having a first configuration in which said braking piston is in a resting position in which it does not act on said lining mounting and it does not apply any load to said at least one braking member, whereby said parking brake is not applied, as well as a second configuration in which said braking piston is in a working position in which it acts on said lining mounting and it applies a predetermined load to said at least one braking member, whereby said parking brake is applied; said system being characterized in that it furthermore has a third configuration in which, when said rail vehicle is not stationary and the ambient temperature in the environment of said braking member is greater than a predetermined threshold value, it forces the movement of said braking piston from its working position into a fuse position different from its resting position, in which fuse position the load applied to said at least one braking member is limited or cancelled.

The braking system according to the invention makes it possible, by forcing the braking piston to leave its working position, to limit or to cancel the temperature increase arising from the rubbing of the linings on the disk when the latter rotates.

In the braking system according to the invention, the temperature increase induced could deteriorate the disk and/or the braking system and/or the immediate environment of that system and of the braking member, or even more generally the bogie on which that system and that member are mounted.

It is to be noted that the parking brake is normally applied when the rail vehicle is stationary, so as to keep that vehicle immobilized and enable its user and in particular its driver to leave the vehicle.

The parking brake is not dimensioned to stop the rail vehicle in locomotion but only to keep it stationary.

The system according to the invention thus makes it possible to provide a solution to the abnormal situation in which the piston is inadvertently in working position when the rail vehicle is in locomotion and thus not stationary. On account of the dimensioning of the parking brake, it would be possible for this abnormal situation not to be detected by the driver of the rail vehicle and, by virtue of the invention, the rail vehicle could continue in locomotion without risk. On the contrary, this situation could be detected by the driver and the latter could, by virtue of the invention, end his locomotion without risk.

The system according to the invention also makes it possible, by virtue of its security, to over-dimension the parking brake relative to conventional parking brakes, for example so as to reduce their number on each bogie of the rail vehicle and thereby provide one braking system per bogie which is ultimately more compact and/or which provides better performance while being particularly safe.

According to preferred, simple, convenient and economical features of the system according to the invention:

said actuator further comprises at least one spring member accommodated in said cavity, said braking piston delimits with said body a pressure chamber configured to be connected by a pipe to a source of pressure agent and, in said first configuration of said system, said pressure chamber is supplied by said source of pressure agent while in said second configuration of said system, said pressure chamber is not supplied by said source of pressure agent;

said system comprises a retractable load transmission member distinct from said actuator and from said lining mounting and configured to place said braking piston in its fuse position;

said retractable load transmission member is disposed in said body between said braking piston and said lining mounting;

said retractable load transmission member is disposed in said body between said lining mounting and said lining;

in its fuse position, said braking piston is placed to bear against an inside wall of said body delimiting said cavity and optionally said pressure chamber;

said retractable load transmission member is formed by at least one part produced from a predetermined material which, under said predetermined threshold temperature value, is in a rigid state enabling it to transmit the load applied by said braking piston and/or by said lining mounting to said at least one braking member and which, above said predetermined threshold temperature value, is in a deformed state in which said retractable member no longer transmits said load;

said retractable load transmission member is formed by a first part and a second part mechanically connected by a frangible link, in particular by bonding or welding or insertion, to said first part; said first and second parts, under said predetermined threshold temperature value, being connected together and enabling the load applied by said braking piston and/or by said lining mounting to be transmitted to said at least one braking member and, above said predetermined threshold temperature value, said second part being disconnected from said first part at the location of said frangible link and being translationally driven by said braking piston and/or by said lining mounting relative to said first part; said retractable member no longer transmitting said load;

said retractable load transmission member is formed by a deformable envelope only partly filled with a volume of a predetermined material which, under said predetermined threshold temperature value, is in a rigid state enabling it to transmit the load applied by said braking piston and/or by said lining mounting to said at least one braking member and which, above said predetermined threshold temperature value, creeps and migrates into an empty zone of said envelope, which envelope deforms such that said retractable member no longer transmits said load;

said retractable load transmission member is formed by a part interposed between a thrust rod of said braking piston and an inside wall of said body delimiting said cavity, said part being formed from shape-memory material which, under said predetermined threshold temperature value, is in a first state enabling transmission of the load applied by said braking piston to said at least one braking member and which, above said predetermined threshold temperature value, is in a second state in which it pushes said braking piston away into said cavity such that said retractable member prevents transmission of said load;

said braking piston is provided with a head accommodated in said cavity, with a thrust rod distinct from said head, projecting from said cavity and having a free end bearing on said lining mounting, and with a releasable mechanism for mechanically connecting said thrust rod to said head; and said retractable load transmission member is formed by a part interposed between a first stop formed by a section of said releasable mechanism and a second stop formed by a rib provided on said thrust rod, said part being formed from shape memory material which, under said predetermined threshold temperature value, is in a first state in which said thrust rod and said head are mechanically connected so as to apply the load to said at least one braking member and which, above said predetermined threshold temperature value, is in a second state in which it actuates said releasable mechanism so as to mechanically disconnect said thrust rod and said head and thereby eliminate said load;

said retractable load transmission member is formed by an actuator (or jack) provided with a movable arm which, under said predetermined threshold temperature value, has an extended position in which it transmits the load applied by said braking piston and/or by said lining mounting to said at least one braking member and which, above said predetermined threshold temperature value, has a retracted position in which it no longer transmits said load;

said system further comprises a temperature sensor disposed in immediate proximity to said at least one braking member as well as a control and command unit of said actuator configured to control and command said movable arm according to said ambient temperature;

said retractable load transmission member is formed by a part interposed between said lining mounting and said at least one lining and produced from a predetermined material which, under said predetermined threshold temperature value, mechanically connects said at least one lining to said lining mounting to transmit the load applied by the latter to said at least one disk and which, above said predetermined threshold temperature value, frees said at least one lining from said lining mounting to cancel said load; and/or said part forms an adhesive layer interposed between said lining mounting and said at least one lining, or is formed by at least one fastening stud emerging from one of a said lining mounting or said at least one lining and being received in at least one aperture of the other of said at least one lining or said lining mounting.

According to a second aspect, the invention also relates to a bogie configured to equip a rail vehicle, comprising a braking member provided with at least one lining and a disk, as well as a rail vehicle braking system as described above, of which said parking brake is configured to apply a load on said disk of said rail vehicle braking member.

The bogie according to the invention is particularly compact and economical since it can only comprise for example a single rail vehicle braking system referred to as a parking braking system, which is dimensioned to keep said bogie stationary by application on a dedicated central disk, so as, for example, to reduce the weight of the bogie, while providing braking performance that is at least similar, or even better.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
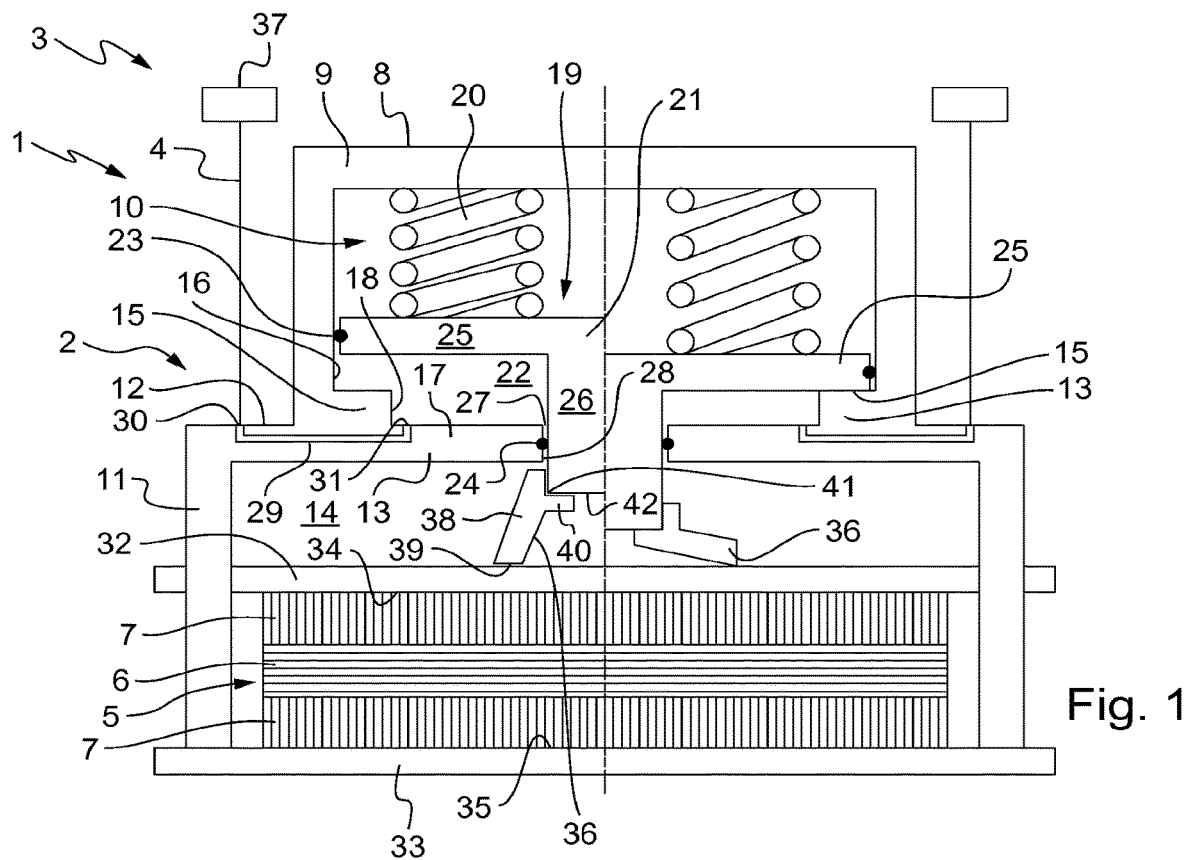
FIG. 1 diagrammatically illustrates a rail vehicle braking system in accordance with a first embodiment of the invention, in a configuration on the left part of the Figure in which the parking brake is applied and in another configuration on the right part of the Figure in which the application of the parking brake is limited or cancelled.

FIG. 1 diagrammatically represents a rail vehicle braking system 1 for a rail vehicle (not shown), provided with a parking brake 2 here formed by a floating movable caliper, which can be seen in two distinct configurations. On the left part of FIG. 1, the parking brake 2 is applied while on the right part of that Figure, the action of the parking brake 2 is cancelled.

The rail vehicle braking system 1 further comprises a supply network 3 for pressure agent, which is pneumatic here, connected to the parking brake 2 via a distribution pipe 4, as well as a braking member 5 provided here with a brake disk 6 and two linings 7 configured to sandwich the brake disk 6.

The parking brake 2 comprises a body 8 provided with a first portion 9 in which is provided a cavity 10, and a second portion 11 connecting the first portion 9 by a first shoulder 12.

The body 8 is furthermore provided with an inside wall 13 delimiting the cavity 10 provided in the first portion 9 and forming a barrier between that cavity 10 and a clamping space 14 defined by the second portion 11.

This inside wall 13 has a first section 15 extending from an inside face 16 of the first portion 9 and a second section 17 connecting to the first section 15 via a second shoulder 18.

The parking brake 2 further comprises an actuator 19 provided with a spring member 20 (also called member with springs) accommodated in the cavity 10 of the first portion 9 and with a braking piston 21 movable relative to the body 8 and delimiting with the body 8 a parking brake pressure chamber 22.

This pressure chamber 22 is provided in the cavity 10 and delimited by the braking piston 21, by the inside face 16 of the first portion 9 and by the inside wall 13 of the body 8.

The braking piston 21 comprises a head 25 accommodated in the cavity 10 and a thrust rod 26 extending from the head 25 and projecting into the clamping space 14 through an opening 27 provided in the inside wall 13 of the body 8.

The head 25 is movable relative to the body 8 in the cavity 10 in a first axial direction, and the thrust rod 26 is also movable relative to the body 8 both in the cavity 10 and in the clamping space 14 in the first axial direction.

The parking brake 2 is furthermore provided with a first sealing member 23 interposed between the head 25 of the braking piston 21 and the inside face 16 of the first portion 9, and with a second sealing member 23 interposed between a free edge 28 of the inside wall 13 located at the opening 27 and the thrust rod 26 of the braking piston 21.

The pressure chamber 22 is connected to the distribution pipe 4 by a channel 29 provided in the body 8, which channel 29 opens at a first end to the outside of the body 8 by a first aperture 30 where the pipe 4 connects and opens at a second end, which is an opposite end to the first end, into the pressure chamber 22 by a second aperture 31.

The parking brake 2 further comprises a first lining mounting 32 which is movable relative to the body 8 in the clamping space 14, as well as a second lining mounting 33 attachedly mounted to one end of the second portion 11 of the body 8.

The first lining mounting 32 has a mounting face 34 on which is fastened one of the linings 7 and the second lining mounting 33 also has a mounting face 35 on which is fastened the other of the linings 7.

The parking brake 2 is configured here such that the braking piston 21 is provided to act on the first lining mounting 32 which is movable and is itself provided to act on the brake disk 6 via the respective lining 7

As mentioned above, the parking brake 2 is arranged here as a floating caliper such that it is first of all the action of moving in the first axial direction, towards the disk 6, the group comprising braking piston 21, first lining mounting 32 and respective lining 7, which comes to apply a load on one side of the disk 6 and, when that load reaches a predetermined threshold value, it is the whole of the body 8 which moves in a second axial direction opposite to the first axial direction, to approach the second lining mounting 33 and its respective lining 7 to come also to apply a load on an opposite side of the disk 6.

It is to be noted that the brake disk 6 is here a disk dedicated to the parking brake 2 and that they are both mounted on a bogie (or axle, not shown) of the rail vehicle. The bogie may comprise a single or several parking brake disk(s) 2 and a single or several dedicated disk(s) 6.

The parking brake 2 further comprises a retractable load transmission member 36, distinct from the actuator 19 and from the first and second lining mountings 32 and 33.

This retractable load transmission member 36 is here disposed in the clamping space 14 of the body 8, between the thrust rod 26 of the braking piston 21 and the first lining mounting 32.

This retractable load transmission member 36 is formed by a part here having a longitudinal branch 38 provided with a free bearing edge 39, and a transverse rib 40 projecting from the longitudinal branch 38 so as to form an accommodation 41 for a free end 42 of the thrust rod 26 of the braking piston 21.

When the pressure chamber 22 is supplied by a source of pressure agent 37 supplying the distribution pipe 4, the system 1 is configured to place the braking piston 21 in a resting position in which it compresses the spring member 20, it does not act on the first lining mounting 32 and it does not apply any load on the brake disk 6; whereby the parking brake 2 is not applied. This state corresponding to a first configuration of the system 1 is not represented in FIG. 1.

When the pressure chamber 22 is deliberately vented or is not supplied by a source of pressure agent 37, the system 1 is configured to place the braking piston 21 in a working position in which it is biased by the spring member 20, it acts on the first lining mounting 32 via the retractable load transmission member 36 including the free bearing edge 39 of its longitudinal branch 38 which is in contact with that first lining mounting 32, and it applies a predetermined load on the brake disk 6 via the respective lining 7; whereby the parking brake 2 is applied. This state corresponding to a second configuration of the system 1 is represented on the left part of FIG. 1.

The part forming the retractable load transmission member 36 is here produced from a predetermined material which, under a predetermined threshold temperature value, is in a rigid state enabling it to transmit the load applied by the braking piston 21 to the first lining mounting 32 and thus to the brake disk 6 via the respective lining 7; and which, above the predetermined threshold temperature value, is in a deformed state in which that retractable member 36 pivots, or more generally retracts, and no longer transmits the load.

The predetermined threshold value is for example comprised between approximately 100° C. and 200° C. and the predetermined material of the retractable member 36 is for example a plastic, a rubber or a metal such as tin.

The retractable load transmission member 36 is thus configured to place the braking piston 21 in what is referred to as a fuse position, in which it is in engagement against the inside wall 13 of the body 8 and, more specifically, in which its head 25 comes to bear against the first section 15 of that inside wall 13. This state corresponding to a third configuration of the system 1 is represented on the right part of FIG. 1.

Thus, when the pressure chamber 22 is vented or is no longer supplied, inadvertently, and when the rail vehicle is not stationary, the ambient temperature in the environment of the brake disk 6 increases until it is greater than the predetermined threshold value; which gives rise to the change in state of the retractable load transmission member 36 to its deformed state.

It will be noted that the venting or not supplying the pressure chamber inadvertently may be due to leakages in the pressure chamber or alternatively may be caused upstream of the parking brake, in the system or possibly in the rail vehicle.

It will furthermore be noted that the change in state of the retractable load transmission member according to the temperature is linked to the changes induced in at least some of their mechanical properties, in particular inherent ones; and that these induced changes mainly occur because the retractable transmission member is under load, that is to say subjected to a force.

The case arising, the system 1 forces the movement of the braking piston 21 from its working position to its fuse position which is different from its resting position, in which fuse position the load applied to the brake disk 6 is cancelled here.

The system 1 illustrated in FIG. 1 may comprise several retractable load transmission members 36.

Figure 2:
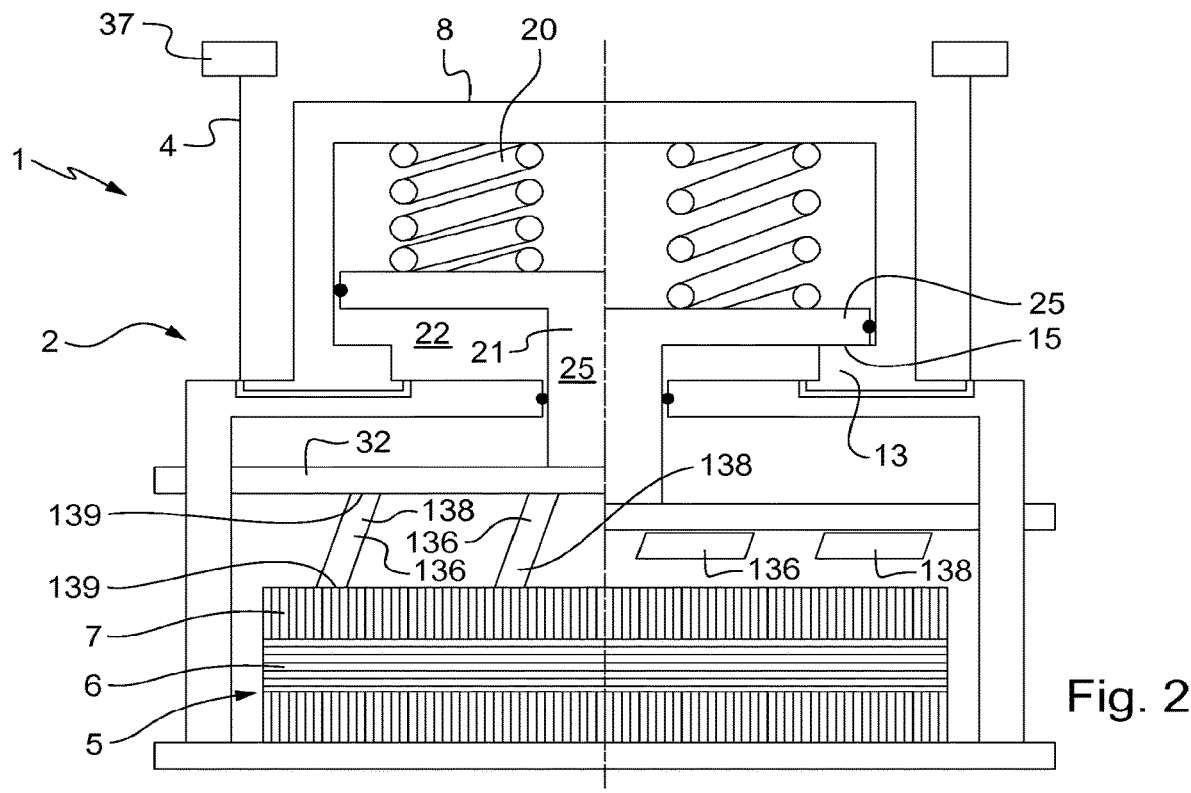
FIG. 2 is a similar view to that of FIG. 1, illustrating a variant embodiment of the system illustrated in that Figure.

FIG. 2 represents a variant embodiment of the rail vehicle braking system as described above.

Generally, for similar parts, the same reference numbers have been used, except for the retractable load transmission member for which the number 100 has been added to the reference numbers.

The system 1 here comprises two retractable load transmission members 136 which are quite similar to those illustrated in FIG. 1, and are each formed by a part here having a single longitudinal branch 138 which is disposed in the body 8 between the lining mounting and the respective lining 7.

In the first configuration of the system (not illustrated), when the pressure chamber 22 is supplied by the source of pressure agent 37 supplying the distribution pipe 4, the braking piston 21 is in its resting position in which it compresses the spring member 20, it does not act on the first lining mounting 32 and it does not apply any load on the brake disk 6; whereby the parking brake 2 is not applied.

In the second configuration of the system (left part of FIG. 2), when the pressure chamber 22 is deliberately vented or is not supplied by the source of pressure agent 37, the braking piston 21 is in its working position in which it is biased by the spring member 20, it acts on the first lining mounting 32 which acts on the respective lining 7 via each retractable load transmission member 136 of which the free bearing edges 139 of its longitudinal branch 138 are respectively in contact with that first lining mounting 32 and with that respective lining 7, and it applies a predetermined load on the brake disk 6 via the respective lining 7; whereby the parking brake 2 is applied.

The part forming each retractable load transmission member 136 is here produced from a predetermined material which, under a predetermined threshold temperature value, is in a rigid state enabling it to transmit the load applied by the braking piston 21 and by the first lining mounting 32 to the respective lining 7 and thus to the brake disk 6 and which, above the predetermined threshold temperature value, is in a deformed state in which each retractable member 136 pivots, or more generally retracts, and no longer transmits the load.

The predetermined threshold value is for example comprised between approximately 100° C. and 200° C. and the predetermined material of each retractable member 136 is for example a plastic, a rubber or a metal such as tin.

Thus, in the third configuration of the system (right part of FIG. 2), when, inadvertently, the pressure chamber 22 is vented or is no longer supplied, and when the rail vehicle is not stationary, the ambient temperature in the environment of the brake disk 6 increases until it is greater than the predetermined threshold value; which gives rise to the change in state of each retractable load transmission member 136 to its deformed state to force the movement of the braking piston 21 from its working position to its fuse position which is different from its resting position, in which fuse position it is in engagement against the inside wall 13 of the body 8 and, more specifically, in which its head 25 comes to bear against the first section 15 of that inside wall 13, so as to cancel the load applied to the brake disk 6.

It is possible for the system 1 illustrated in FIG. 2 to comprise only one retractable load transmission member 136, or to comprise more than two.

Figure 3:
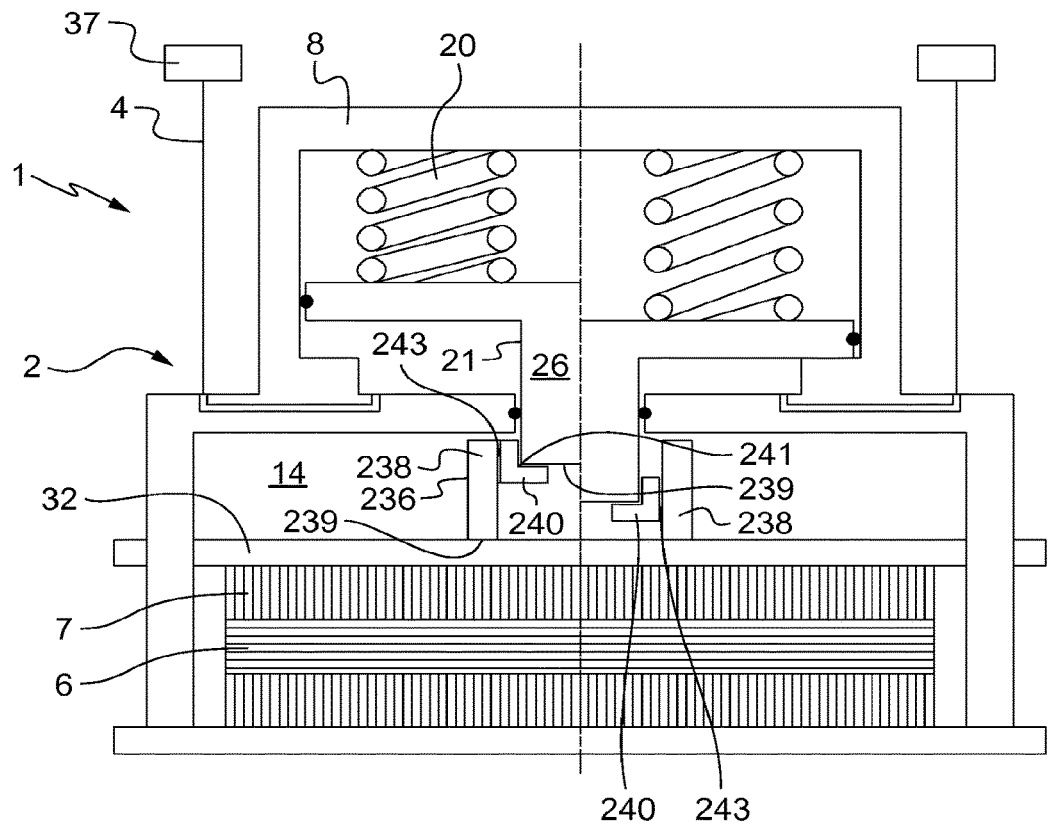
FIG. 3 diagrammatically illustrates a rail vehicle braking system in accordance with a second embodiment of the invention, the parking brake being shown, as in FIG. 1, in different configurations.

FIG. 3 represents a second embodiment of the rail vehicle braking system as described with reference to FIG. 1.

Generally, for similar parts, the same reference numbers have been used, except for the retractable load transmission member for which the number 200 has been added to the reference numbers.

The retractable load transmission member 236 is here disposed in the clamping space 14 of the body 8, between the thrust rod 26 of the braking piston 21 and the first lining mounting 32.

This retractable load transmission member 236 is formed by a first longitudinal part 238 provided with a free bearing edge 239, and a substantially L-shaped second part 240 so as to form an accommodation 241 for a free end 42 of the thrust rod 26 of the braking piston 21.

The L-shaped second part 240 is mechanically connected by a frangible link 243, in particular by bonding or welding or insertion, to the first longitudinal part 238.

The frangible link 243 of the retractable load transmission member 236 is configured to join, under a predetermined threshold temperature value, the first and second parts 238 and 240 and, above the predetermined threshold temperature value, to disconnect the first and second parts 238 and 240 and allow the translational movement (in particular in the first axial direction) of the L-shaped second part 240 relative to the longitudinal first part 238.

The predetermined threshold is for example comprised between approximately 100° C. and 200° C.

In the first configuration of the system (not illustrated), when the pressure chamber 22 is supplied by the source of pressure agent 37 supplying the distribution pipe 4, the braking piston 21 is in its resting position in which it compresses the spring member 20, it does not act on the first lining mounting 32 and it does not apply any load on the brake disk 6; whereby the parking brake 2 is not applied.

In the second configuration of the system (left part of FIG. 3), when the pressure chamber 22 is deliberately vented or is not supplied by the source of pressure agent 37, the braking piston 21 is in its working position in which it is biased by the spring member 20, it acts on the first lining mounting 32 via the retractable load transmission member 236 of which the first and second parts 238 and 240 are joined and of which the free edge 239 is in contact with the first lining mounting 32, and it applies a predetermined load on the brake disk 6 via the respective lining 7; whereby the parking brake 2 is applied.

In the third of the system (right part of FIG. 3), when, inadvertently, the pressure chamber 22 is vented or is no longer supplied, and when the rail vehicle is not stationary, the ambient temperature in the environment of the brake disk 6 increases until it is greater than the predetermined threshold value; which gives rise to the breaking of the frangible link 243 and thus to the disconnection of the first and second parts 238 and 240 to force the movement of the braking piston 21 from its working position to its fuse position which is different from its resting position, in which fuse position it is in engagement against the inside wall 13 of the body 8 and, more specifically, in which its head 25 comes to bear against the first section 15 of that inside wall 13, so as to cancel the load applied to the brake disk 6.

The retractable load transmission member 236 may be disposed between the lining mounting and the respective lining rather than between the braking piston and the lining mounting and/or the system 1 illustrated in FIG. 3 may comprise several retractable load transmission members 236.

Figure 4:
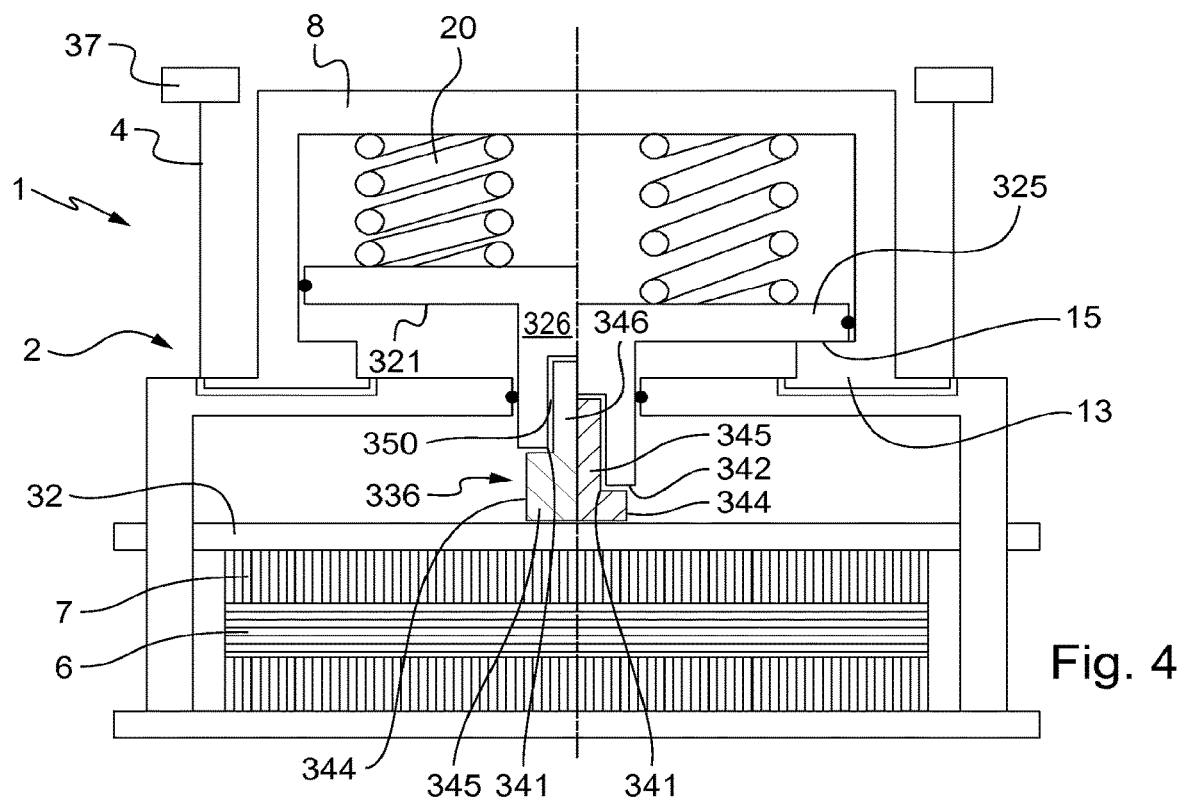
FIG. 4 diagrammatically illustrates a rail vehicle braking system in accordance with a third embodiment of the invention, the parking brake being shown, as in FIG. 1, in different configurations.

FIG. 4 represents a third embodiment of the rail vehicle braking system as described with reference to FIG. 1.

Generally, for similar parts, the same reference numbers have been used, except for the braking piston and the retractable load transmission member for which the number 300 has been added to the reference numbers.

The retractable load transmission member 336 is here disposed in the clamping space 14 of the body 8, between the braking piston 321 and the first lining mounting 32.

The thrust rod 326 of the braking piston 321 is here provided with a recess 350.

The retractable load transmission member 336 is formed by a deformable envelope 344 only partly filled with a volume of predetermined material 345 which, under a predetermined threshold temperature value, is in a rigid state enabling it to transmit a given load and which, above the predetermined threshold temperature value, creeps and migrates into an empty zone 346 of the envelope. This envelope 344 then deforms such that the retractable member no longer transmits that load.

The deformable envelope 344 has a portion 347 which is received in the recess 350 of the thrust rod 326 as well as a movable accommodation 341 for the free end 342 of that thrust rod 326.

The predetermined threshold value is for example comprised between approximately 100° C. and 200° C., the envelope 344 is for example produced from metal, such as steel, and the predetermined material 345 contained in that envelope 344 is for example a plastic, a rubber or a metal such as tin.

In the first configuration of the system (not illustrated), when the pressure chamber 22 is supplied by the source of pressure agent 37 supplying the distribution pipe 4, the braking piston 321 is in its resting position in which it compresses the spring member 20, it does not act on the first lining mounting 32 and it does not apply any load on the brake disk 6; whereby the parking brake 2 is not applied.

In the second configuration of the system (left part of FIG. 4), when the pressure chamber 22 is deliberately vented or is not supplied by the source of pressure agent 37, the braking piston 321 is in its working position in which it is biased by the spring member 20, it acts on the first lining mounting 32 via the retractable load transmission member 336 of which the envelope 344 rests on that first lining mounting 32, and it applies a predetermined load on the brake disk 6 via the respective lining 7; whereby the parking brake 2 is applied.

As mentioned above, under the predetermined threshold temperature value, the retractable load transmission member 336 is in a rigid state enabling it to transmit the load applied by the braking piston 321 to the first lining mounting 32 and thus to the lining 7 and to the brake disk 6 and, above the predetermined threshold temperature value, is in a deformed state in which the material 345 creeps and migrates into the empty zone 346 of the envelope 344 which deforms under the action of the thrust rod 326.

Thus, in the third configuration of the system (right part of FIG. 4), when, inadvertently, the pressure chamber 22 is vented or is no longer supplied, and when the rail vehicle is not stationary, the ambient temperature in the environment of the brake disk 6 increases until it is greater than the predetermined threshold value; which gives rise to the change in state of the material 345 and of the envelope 344 and the movement of the accommodation 341 to force the movement of the head 325 of the braking piston 321 from its working position to its fuse position which is different from its resting position, in which fuse position it is in engagement against the first section 15 of the inside wall 13 of the body 8; so as to cancel the load applied to the brake disk 6.

Figure 5:
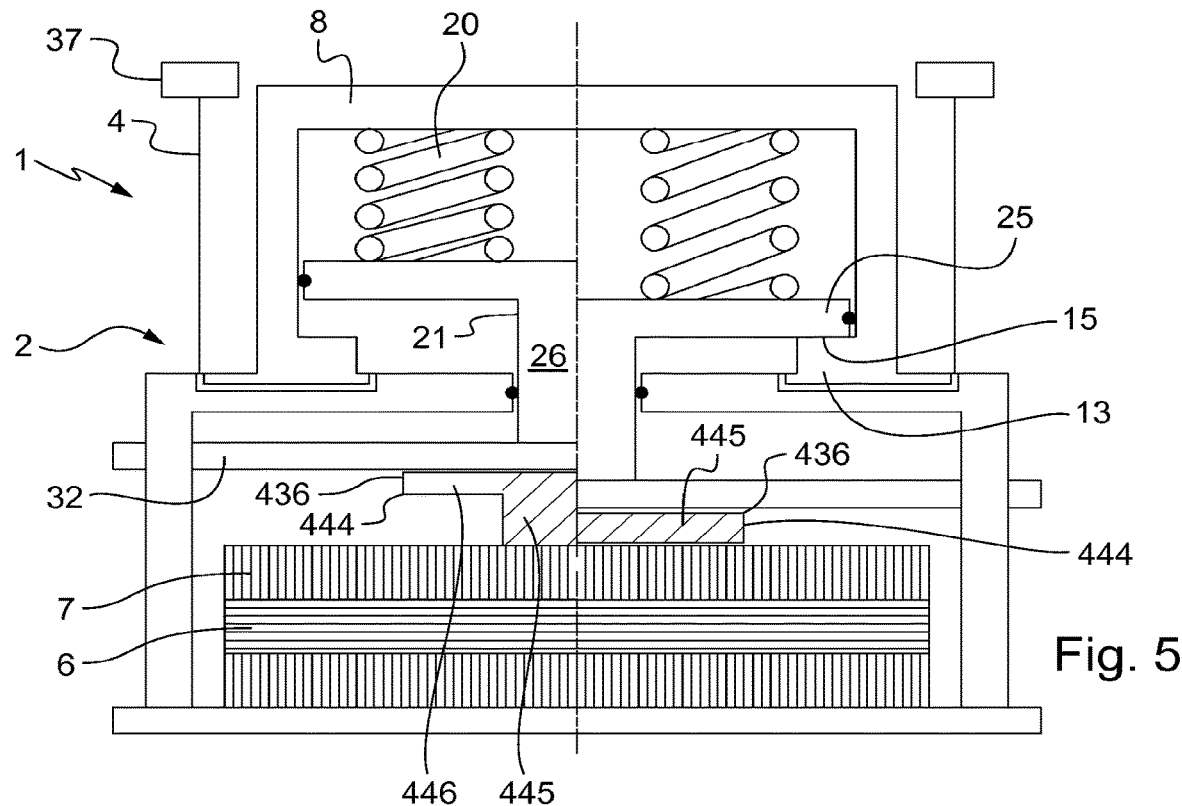
FIG. 5 is a similar view to that of FIG. 4, illustrating a variant embodiment of the system illustrated in that Figure.

FIG. 5 represents a variant embodiment of the rail vehicle braking system as described with reference to FIG. 4.

Generally, for similar parts, the same reference numbers have been used as those used for FIG. 1, except for the retractable load transmission member for which the number 400 has been added to the reference numbers.

The retractable load transmission member 436 is here disposed in the body 8 between the lining mounting and the respective lining 7.

The retractable load transmission member 436 is formed by a deformable envelope 444 only partly filled with a volume of a predetermined material 445.

In the first configuration of the system (not illustrated), when the pressure chamber 22 is supplied by the source of pressure agent 37 supplying the distribution pipe 4, the braking piston 21 is in its resting position in which it compresses the spring member 20, it does not act on the first lining mounting 32 and it does not apply any load on the brake disk 6; whereby the parking brake 2 is not applied.

In the second configuration of the system (left part of FIG. 5), when the pressure chamber 22 is deliberately vented or is not supplied by the source of pressure agent 37, the braking piston 21 is in its working position in which it is biased by the spring member 20, it acts on the first lining mounting 32 which acts on the respective lining 7 via the retractable load transmission member 436 of which the edges 444 are respectively in contact with that first lining mounting 32 and with that respective lining 7, and it applies a predetermined load on the brake disk 6 via the respective lining 7; whereby the parking brake 2 is applied.

The envelope 444 and the material 445 that it contains are configured such that, under a predetermined threshold temperature value, the retractable load transmission member 436 is in a rigid state enabling it to transmit the load applied by the braking piston 21 and by the first lining mounting 32 to the lining 7 and thus to the brake disk 6 and, above the predetermined threshold temperature value, the material 445 creeps and migrates into the free zone 446 of the envelope 444 and the latter deforms under the action of the piston and of the first lining mounting; such that the retractable member 436 is in a deformed state in which it no longer transmits the load.

The predetermined threshold value is for example comprised between approximately 100° C. and 200° C., the envelope 444 is for example produced from metal, such as steel, and the predetermined material 445 contained in that envelope 444 is for example a plastic, a rubber or a metal such as tin.

Thus, in the third configuration of the system (right part of FIG. 5), when, inadvertently, the pressure chamber 22 is vented or is no longer supplied, and when the rail vehicle is not stationary, the ambient temperature in the environment of the brake disk 6 increases until it is greater than the predetermined threshold value; which gives rise to the change in state of the material 445 and of the envelope 444 which flattens to force the movement of the head 25 of the braking piston 21 from its working position to its fuse position which is different from its resting position, in which fuse position it is in engagement against the first section 15 of the inside wall 13 of the body 8; so as to cancel the load applied to the brake disk 6.

Under the predetermined threshold temperature value, the envelope 444 here is substantially L-shaped whereas above the predetermined threshold temperature value, the envelope 444 here is parallelepiped and flattened.

The systems 1 illustrated in FIGS. 4 and 5 could be provided with several retractable load transmission members 336, 436.

Figure 6:
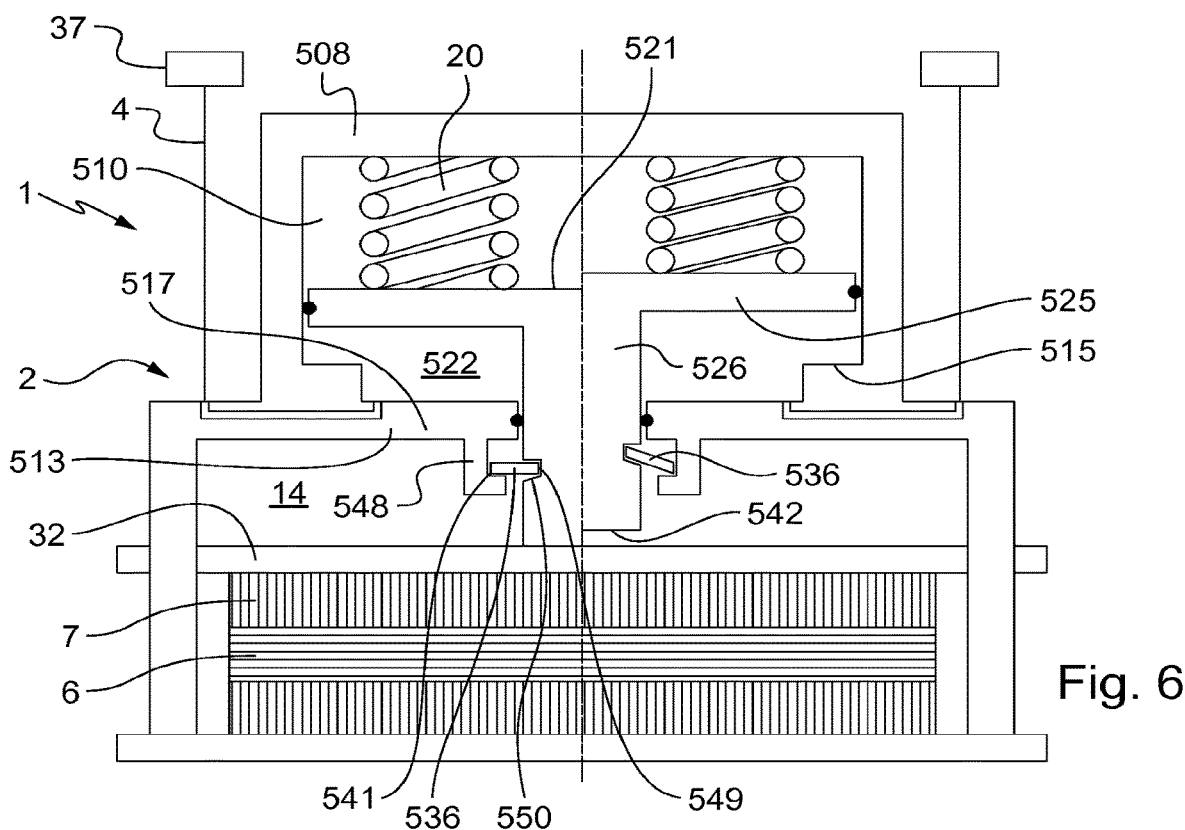
FIGS. 6 to 9 diagrammatically illustrate rail vehicle braking systems respectively in accordance with fourth, fifth, sixth and seventh embodiments of the invention, the parking brake being each time shown, as in FIG. 1, in different configurations.

FIG. 6 represents a fourth embodiment of the rail vehicle braking system as described with reference to FIG. 1.

Generally, for similar parts, the same reference numbers have been used, except for the body, the braking piston and the retractable load transmission member for which the number 500 has been added to the reference numbers.

The retractable load transmission member 536 is here formed by a part interposed between the thrust rod 526 of the braking piston 521 and the inside wall 513 of the body 508 delimiting the cavity 510 and the pressure chamber 522.

The inside wall 513 is provided with a mounting lug 548 extending from the second section 517, projecting into the clamping space 14.

This mounting lug 548 is substantially L-shaped so as to form an accommodation 541 for the reception of a first end portion of the retractable member 536.

The thrust rod 526 of the braking piston 521 has a recess 550 forming a complementary accommodation 549 for the reception of a second end portion of the retractable member 536, which is an opposite end portion to the first end portion.

The retractable member 536 is formed here from a shape-memory material, for example an alloy of titanium and nickel and is configured such that, under a predetermined threshold temperature value, it is in a first state and such that, above the predetermined threshold temperature value, it is in a second state different from the first state and in which the retractable member 536 acts on the braking piston 521 in the second axial direction, against the spring member 20.

The predetermined threshold is for example comprised between approximately 100° C. and 200° C.

In the first configuration of the system (not illustrated), when the pressure chamber 22 is supplied by the source of pressure agent 37 supplying the distribution pipe 4, the braking piston 521 is in its resting position in which it compresses the spring member 20, it does not act on the first lining mounting 32 and it does not apply any load on the brake disk 6; whereby the parking brake 2 is not applied.

In the second configuration of the system (left part of FIG. 6), when the pressure chamber 22 is deliberately vented or is not supplied by the source of pressure agent 37, the braking piston 521 is in its working position in which it is biased by the spring member 20, it acts directly on the first lining mounting 32 via the free end 542 of its thrust rod 526 which is in contact with the first lining mounting 32, and it applies a predetermined load on the brake disk 6 via the respective lining 7; whereby the parking brake 2 is applied.

In this second configuration, the retractable member 536 is in its first state in which it permits, or does not block, the transmission of the load applied by the braking piston 521 on the first lining mounting 32.

In the third configuration of the system (left part of FIG. 6) when, inadvertently, the pressure chamber 22 is vented or is no longer supplied, and when the rail vehicle is not stationary, the ambient temperature in the environment of the brake disk 6 increases until it is greater than the predetermined threshold value; which drives the change of state of the retractable member 536 to its second state in which it becomes tensioned and extends to push the braking piston 521 away into the cavity 510 of the body 508, against the spring member 20, such that the thrust rod 526 is at a distance from the first lining mounting 32 and no longer transmits the load to the disk 6.

In this third configuration, the head 525 of the braking piston 521 is thus at a distance from the first section 515 of the inside wall 513 of the body 508.

In a fourth configuration of the system 1, when the temperature returns below the predetermined threshold value, the retractable member 536 resumes its first state in which it does not act upon the braking piston 521.

The system 1 illustrated in FIG. 6 can comprise several retractable members 536 cooperating at the same time with the body and the thrust rod and/or with the body and the head of the braking piston.

Figure 7:
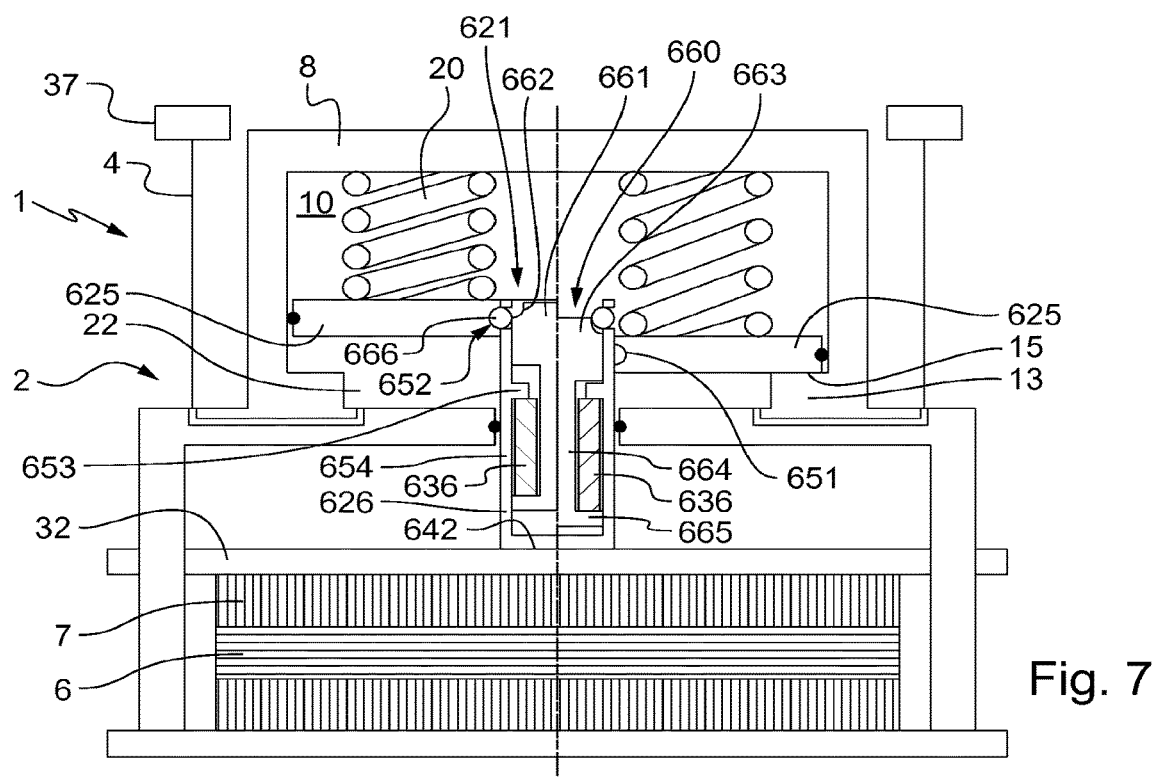

FIG. 7 represents a fifth embodiment of the rail vehicle braking system as described with reference to FIG. 1.

Generally, for similar parts, the same reference numbers have been used, except for the braking piston and the retractable load transmission member for which the number 600 has been added to the reference numbers.

The head 625 and the thrust rod 626 of the braking piston 621 are here distinct from each other; and the braking piston 621 comprises a releasable mechanism 660 for mechanical connection of the thrust rod 626 to the head 625, according to the state of the retractable load transmission member 636.

The head 625 of the braking piston 621 is provided with a circular depression 651.

The thrust rod 626 of the braking piston 621 is provided with a window 652 provided at one end which is an opposite end to the free end 642 in contact with the first lining mounting 32, and with a rib 653 provided projecting from a main wall 654 extending between the window 652 and the free end 642. The rib 653 projects into the cavity 10, out of the pressure chamber 22, and forms a stop, called second stop.

The releasable mechanism 660 comprises a body 661 having a first section 663 in which is provided an accommodation 662 which is semi-circular here, a second section 664 extending the first section 663, to a third section 665 which is remote from the first section 663.

The second section 664 extends facing the main wall 654 of the thrust rod 626, the first section 663 is disposed at least partially facing the window 652 of that thrust rod 626, and the third section 665 is situated between the rib 653 and the free end 642 of that thrust rod 626. This third section 665 forms a stop called first stop.

The releasable mechanism 660 further comprises a movable locking member 666 formed for example by a spherical bead, and housed at least partly in the window 652 of the thrust rod 626.

The retractable load transmission member 636 is formed here by a part interposed between the first stop formed by the third section 665 of the body 661 of the releasable mechanism 660 and the second stop formed by the rib 653 provided on the thrust rod 626.

The retractable member 636 is formed here from a shape-memory material, for example an alloy of titanium and nickel and is configured such that, under a predetermined threshold temperature value, it is in a first state in which it is mechanically connected to the thrust rod 626 and the head 625 of the braking piston 621 and such that, above the predetermined threshold temperature value, it is in a second state different from the first state and in which it is mechanically disconnected from the thrust rod 626 and the head 625 of the braking piston 621

The predetermined threshold is for example comprised between approximately 100° C. and 200° C.

In the first configuration of the system (not illustrated), when the pressure chamber 22 is supplied by the source of pressure agent 37 supplying the distribution pipe 4, the braking piston 621 is in its resting position in which it compresses the spring member 20, it does not act on the first lining mounting 32 and it does not apply any load on the brake disk 6; whereby the parking brake 2 is not applied.

In the second configuration of the system (left part of FIG. 7), when the pressure chamber 22 is deliberately vented or is not supplied by the source of pressure agent 37, the braking piston 621 is in its working position in which it is biased by the spring member 20, it acts directly on the first lining mounting 32 via the free end 642 of its thrust rod 626 which is in contact with the first lining mounting 32, and it applies a predetermined load on the brake disk 6 via the respective lining 7; whereby the parking brake 2 is applied.

In this second configuration, the retractable member 636 is in its first state and the first section 663 of the body 661 of the releasable mechanism 660 is disposed facing the window 652 of the thrust rod, its accommodation 662 being offset relative to that window 652, and the movable locking member 666 is accommodated both in that window 625 and in the circular recess 651 of the head 625; whereby the head 625 and the thrust rod 626 are mechanically connected and enable the load to be applied to the disk 6.

In the third configuration of the system (right part of FIG. 7), when the pressure chamber 22 is vented or is no longer supplied, inadvertently, and when the rail vehicle is not stationary, the ambient temperature in the environment of the brake disk 6 increases until it is greater than the predetermined threshold value; which gives rise to the change in state of the retractable load transmission member 636 to its second state in which it becomes tensioned and extends In its second state, the retractable member 636 acts on the third section 665 and translationally drives the body 661 of the releasable mechanism 660 in the first axial direction, until the accommodation 662 provided in the first section 663 is disposed facing the window 652 and the movable locking member 666 is freed from the circular depression 651 of the head 625 of the braking piston 621; whereby the head 625 and the thrust rod 626 are mechanically connected.

Thus, the head 625 of the braking piston 521 passes from its working position to its fuse position which is different from its resting position, in which fuse position it is in engagement against the first section 15 of the inside wall 13 of the body 8; so as to cancel the load applied to the brake disk 6.

In a fourth configuration of the system 1, when the temperature returns below the predetermined threshold value, the retractable member 636 resumes its first state in which it mechanically connects to the head 625 and the thrust rod 625.

Figure 8:
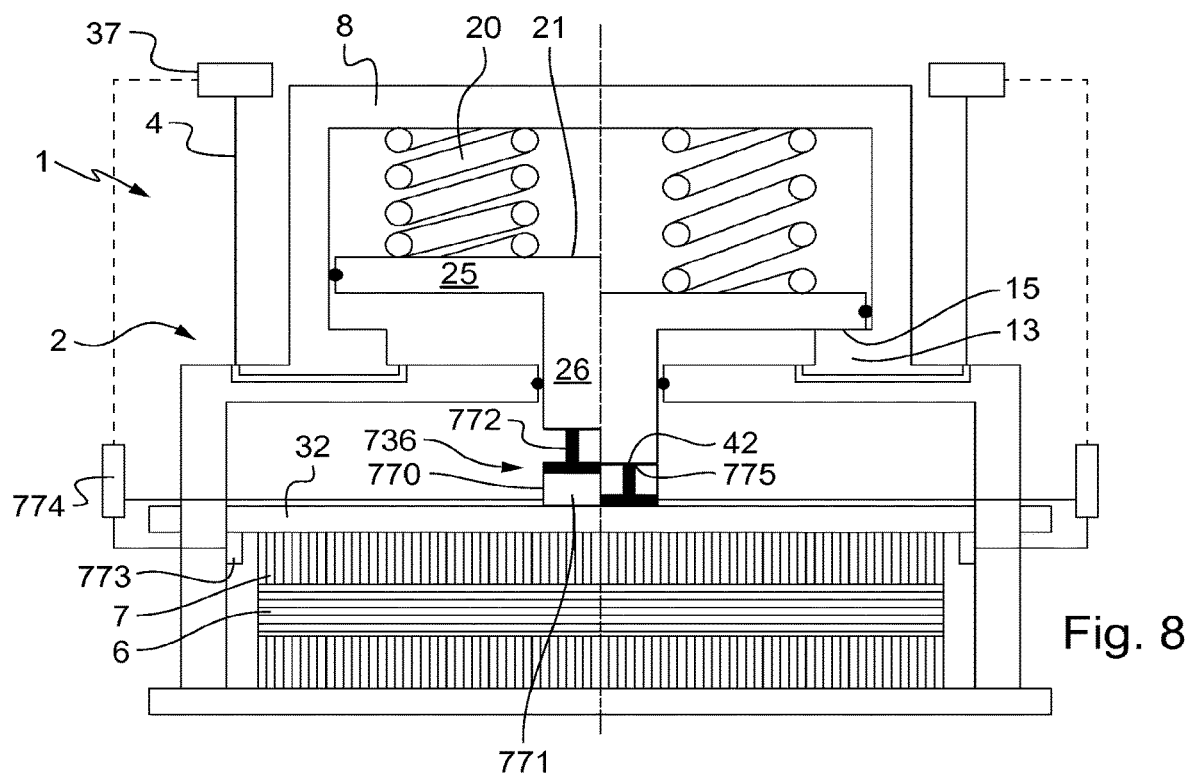

FIG. 8 represents a sixth embodiment of the rail vehicle braking system as described with reference to FIG. 1.

Generally, for similar parts, the same reference numbers have been used, except for the retractable load transmission member for which the number 700 has been added to the reference numbers.

The retractable load transmission member 736 is here disposed in the clamping space 14 of the body 8, between the thrust rod 26 of the braking piston 21 and the first lining mounting 32.

This retractable load transmission member 736 is formed by an actuator 770 having a chamber 771 laid on the first lining mounting 32 and a movable arm 772 partly accommodated in the chamber 771 and having a free end 775 fixedly attached to the free end 42 of the thrust rod 26 of the braking piston.

The system 1 comprises a temperature sensor 773 disposed in the immediate vicinity of the disk 6 and of the linings 7, a control and command unit 774 connected to the temperature sensor 773 and configured to control and command the movable arm 772 of the actuator according to the value of ambient temperature measured by the sensor 773.

The system 1 further comprises a connection pipe 773, here pneumatic, opening into the chamber 771 of the actuator 770 and connected to the supply source 37 via the control and command unit 774.

The movable arm 772 is configured to have, under a predetermined threshold temperature value, an extended position (on the left in FIG. 8) in which it transmits the load applied by the braking piston 21 to the first lining mounting 32 and thus to the respective lining 7 and to the disk 6 and to have, above the predetermined threshold temperature value, a retracted position (to the right in FIG. 8) in which it no longer transmits that load.

The predetermined threshold is for example comprised between approximately 100° C. and 200° C.

In the first configuration of the system (not illustrated), when the pressure chamber 22 is supplied by the source of pressure agent 37 supplying the distribution pipe 4, the braking piston 21 is in its resting position in which it compresses the spring member 20, it does not act on the first lining mounting 32 and it does not apply any load on the brake disk 6; whereby the parking brake 2 is not applied.

In the second configuration of the system (left part of FIG. 8), when the pressure chamber 22 is deliberately vented or is not supplied by the source of pressure agent 37, the braking piston 21 is in its working position in which it is biased by the spring member 20, it acts on the first lining mounting 32 via the movable arm 772 of the retractable load transmission member 736, and it applies a predetermined load on the brake disk 6 via the respective lining 7; whereby the parking brake 2 is applied.

In this second configuration, the chamber 771 is at least partially filled with a pressure agent and the movable arm 772 is in its extended position.

In the third configuration of the system (right part of FIG. 8), when the pressure chamber 22 is vented or is no longer supplied, inadvertently, and when the rail vehicle is no longer stationary, the ambient temperature in the environment of the brake disk 6 increases until it is greater than the predetermined threshold value; the control and command unit 774 commands the venting of the chamber 771 and the movable arm 772 passes from its extended position to its retracted position to force the movement of the braking piston 21 from its working position to its fuse position which is different from its resting position, in which fuse position it is in engagement against the inside wall 13 of the body 8, and, more specifically, in which its head 25 comes to bear against the first section 15 of that inside wall 13, so as to cancel the load applied to the brake disk 6.

The actuator 770 may be a hydraulic or electric actuator rather than pneumatic; and the system illustrated in FIG. 8 may comprise several actuators.

In a variant not illustrated, the braking piston of the system illustrated in FIG. 8 may further comprise a releasable mechanism similar to that described with reference to FIG. 7. If required, the actuator may be disposed in the cavity of the body of the system and its movable arm may be configured to act on the first section of the body of the releasable mechanism in order to mechanically fasten or not mechanically fasten the head and the thrust rod for the purpose of applying or cancelling the load on the disc, applied directly by the braking piston which may cooperate with the lining mounting.

Figure 9:
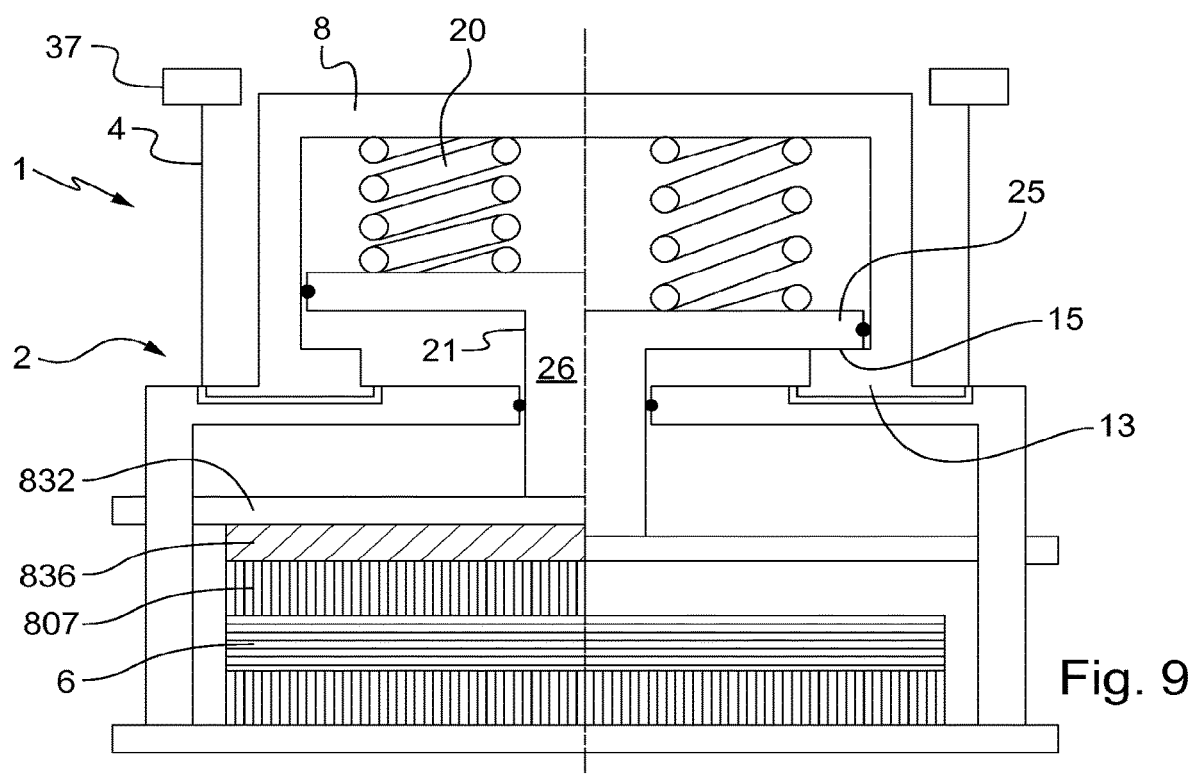

FIG. 9 represents a seventh embodiment of the rail vehicle braking system as described with reference to FIG. 1.

Generally, for similar parts, the same numerical references have been used, except for the lining and the retractable load transmission member, for which the number 800 has been added to the reference numbers.

The retractable load transmission member 836 is formed here by a meltable adhesive layer interposed between the first lining mounting 832 and the respective lining 807 and produced from a predetermined material which, under a predetermined threshold temperature value, mechanically connects that lining 807 to the lining mounting 832 to transmit the load applied by the latter to the disk 6 and which, above the predetermined threshold temperature value, frees the lining 807 from the lining mounting 832 to cancel that load.

The predetermined threshold is for example comprised between approximately 100° C. and 200° C. and the adhesive layer is for example Vinyl-phenolic based.

In the first configuration of the system (not illustrated), when the pressure chamber 22 is supplied by the source of pressure agent 37 supplying the distribution pipe 4, the braking piston 21 is in its resting position in which it compresses the spring member 20, it does not act on the first lining mounting 32 and it does not apply any load on the brake disk 6; whereby the parking brake 2 is not applied.

In the second configuration of the system (left part of FIG. 9), when the pressure chamber 22 is deliberately vented or is not supplied by the source of pressure agent 37, the braking piston 21 is in its working position in which it is biased by the spring member 20, it acts on the first lining mounting 832 which acts on the respective lining 807 via the adhesive layer 836, and it applies a predetermined load on the brake disk 6 via the respective lining 807; whereby the parking brake 2 is applied.

In the third configuration of the system (right part of FIG. 2), when the pressure chamber 22 is vented or is no longer supplied, inadvertently, and when the rail vehicle is no longer stationary, the ambient temperature in the environment of the brake disk 6 increases until it is greater than the predetermined threshold value; which drives a change in state of the adhesive layer 836 until, for example, it disappears, thereby freeing the lining 7 so as to force the movement of the braking piston 21 from its working position to its fuse position which is different from its resting position, in which fuse position it is in engagement against the inside wall 13 of the body 8 and, more specifically, in which its head 25 comes to bear against the first section 15 of that inside wall 13, so as to cancel the load applied on the brake disk 6.

In a variant not illustrated, the meltable adhesive layer is replaced by at least one fastening stud emerging from one of the first lining mounting or the lining and being received in at least one aperture of the other of the lining or the first lining mounting.

In other variants not illustrated:
- the braking piston of the systems illustrated in FIGS. 1 to 6 and 9 may further comprise a releasable mechanism such as that described with reference to FIG. 7;
- the pressure agent is hydraulic rather than pneumatic;
- it is not a pressure agent but rather an electrical supply of the braking piston and, the case arising, it is possible for the system not to have any spring member;
- the compression of the springs may be generated by an electromechanical device rather than by a pneumatic or hydraulic pressure agent; and/or
- the rail vehicle braking system forms a pivoting caliper or a caliper with one or two deformable levers, in the manner of a braking linkage, rather than a floating caliper.

It should be noted more generally that the invention is not limited to the examples described and represented.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle braking system comprising:
   a braking member; and
   a parking brake having an actuator configured to move a braking piston to act on the braking member to apply a load to the braking member,
   wherein, in a first configuration while a vehicle is moving and an ambient temperature is warmer than a predetermined threshold temperature, the actuator of the parking brake is configured to move from a working position to a fuse position that is different from a resting position,
   wherein the load applied to the braking member by the actuator is reduced relative to the working position or is eliminated while the actuator is in the first configuration.

2. The vehicle braking system of claim 1, wherein, in a second configuration, the actuator is in a resting position where the actuator does not apply the load to the braking member and, in a third configuration, the actuator is configured to apply the load to the braking member and apply the parking brake.

3. The vehicle braking system of claim 2, wherein the actuator includes a spring member in a cavity that also includes the braking piston that delimits a pressure chamber in the actuator.

4. The vehicle braking system of claim 3, wherein the pressure chamber of the actuator is configured to be connected by a conduit to a pressure agent source of a pressure agent and, in the second configuration, the pressure chamber is supplied by the pressure agent source, while in the third configuration, the pressure chamber is not supplied by the pressure agent source.

5. The vehicle braking system of claim 1, further comprising:
   a retractable load transmission member that is separate from the actuator, the retractable load transmission member configured to place the braking piston in the fuse position.

6. The vehicle braking system of claim 5, wherein the retractable load transmission member is disposed in the actuator between the braking piston and a brake lining mounting of the braking member.

7. The vehicle braking system of claim 5, wherein the retractable load transmission member is disposed in the actuator between a brake lining mounting of the braking member and a lining of the braking member.

8. A vehicle braking system comprising:
   a braking member; and
   a parking brake having a body with a cavity and a braking piston at least partially disposed within the cavity,
   the braking piston of the parking brake configured to alternate between a resting position in which the braking piston does not apply a braking load to the braking member to release the parking brake, a working position in which the braking piston applies the braking load to the braking member to apply the parking brake, and a fuse position in which a vehicle is moving, an ambient temperature is warmer than a predetermined threshold temperature, and the braking piston is moved to reduce or eliminate the braking load applied to the braking member.

9. The system of claim 8, further comprising:
   a retractable load transmission member disposed in the body of the parking brake and configured to place the braking piston in the fuse position, the retractable load transmission member having at least one part formed from a material that transfers between a rigid state at cooler temperatures that are no warmer than the predetermined threshold temperature to a deformed state at warmer temperatures that are warmer than the predetermined threshold temperature.

10. The system of claim 9, wherein the retractable load transmission member is configured to transmit the braking load applied by the braking piston to the braking member while the at least one part of the retractable load transmission member is in the rigid state.

11. The system of claim 9, wherein the retractable load transmission member is configured to not transmit the braking load applied by the braking piston to the braking member while the at least one part of the retractable load transmission member is in the deformed state.

12. The system of claim 9, wherein the at least one part of the retractable load transmission member includes a first part and a second part connected by a frangible link, the first and second parts coupled with each other and transmitting the braking load applied by the braking piston to the braking member while the first and second parts are no warmer than the predetermined threshold temperature.

13. The system of claim 12, wherein the first part and the second part of the retractable load transmission member are disconnected from each other while the first part and the second part are warmer than the predetermined threshold temperature.

14. The system of claim 8, further comprising:
   a retractable load transmission member disposed in the body of the parking brake and configured to place the braking piston in the fuse position, the retractable load transmission member including a deformable envelope partially filled with a material that is in a rigid state at temperatures that are no warmer than a predetermined threshold temperature and is in a deformed state at temperatures that are warmer than the predetermined threshold temperature.

15. The system of claim 14, wherein the material in the envelope of the retractable load transmission is configured to transmit the braking load applied by the braking piston to the braking member at the temperatures that are no warmer than the predetermined threshold temperature, the material in the envelope configured to migrate into an empty zone of the envelope and not transmit the braking load applied by the braking piston to the braking member at the temperatures that are warmer than the predetermined threshold temperature.

16. A method for controlling a vehicle braking system having a braking member and a parking brake having a body with a cavity and a braking piston at least partially disposed within the cavity, the method comprising:
 transitioning the braking piston of the parking brake to a resting position in which the braking piston does not apply a braking load to the braking member to release the parking brake;
 transitioning the braking piston to a working position in which the braking piston applies the braking load to the braking member to apply the parking brake; and
 transitioning the braking piston to a fuse position responsive to an ambient temperature being warmer than a predetermined threshold temperature, wherein, in fuse position, the braking piston is moved to reduce or eliminate the braking load applied to the braking member.

17. The method of claim 16, wherein transitioning the braking piston to the fuse position occurs responsive to the ambient temperature warming to above the predetermined threshold temperature and a shape memory alloy of a retractable load transmission member of the parking brake transitioning from a rigid state to a deformed state.

18. The method of claim 17, wherein transitioning the braking piston includes transitioning the braking piston to the working position responsive to the shape memory alloy of transitioning from the deformed state to the rigid state.

19. The method of claim 18, further comprising:
 transmitting the braking load applied by the braking piston to the braking member using the shape memory alloy while the shape memory alloy is in the rigid state.

20. The method of claim 18, further comprising:
 preventing transmitting of the braking load applied by the braking piston to the braking member using the shape memory alloy while the shape memory alloy is in the deformed state.

* * * * *